United States Patent Office 3,576,770
Patented Apr. 27, 1971

3,576,770
FLAME-RETARDANT RESIN COMPOSITIONS
Anthony John Evans, Llangollen, Wales, and William Rees Foster, Cwmbran, England, assignors to Monsanto Chemicals Limited, London, England
No Drawing. Filed Apr. 11, 1968, Ser. No. 720,469
Claims priority, application Great Britain, Apr. 27, 1967, 19,492/67
Int. Cl. C08f 47/10; C08j 1/18
U.S. Cl. 260—2.5                                    13 Claims

ABSTRACT OF THE DISCLOSURE

Flame-retardant compositions comprising a normally flammable synthetic resin, especially a foamable synthetic resin, and, as a flame-retardant agent, an ar-halo, ar-alkenyloxy aromatic compound. Also, processes for preparing the compositions.

BACKGROUND OF THE INVENTION

Field of the invention

This invention relates to flame-retardant synthetic resin compositions and, more particularly, to such compositions containing a flame-retardant agent which does not have an unduly deleterious effect on the mechanical properties of foamed products prepared from the compositions.

Description of the prior art

It is known that many synthetic resins, especially hydrocarbon resins such as polyethylene or polystyrene, have a tendency to burn in air and that this tendency is also noticeable when the resins are in an expanded form, e.g., foamed polystyrene. It has been proposed to reduce this tendency by adding a flame-retardant agent, e.g., certain halogen compounds, to impart flame-retardant properties to the resin. However, this proposal has not been entirely successful, since many compounds which would otherwise be good flame-retardant agents have a deleterious effect on the mechanical properties of the resin. For example, it has been found difficult to produce a satisfactory flame-retardant foamed polystyrene containing a halogen compound as a flame-retardant agent, because the mechanical properties of the polystyrene can be so adversely affected that there is a tendency for the foamed polystyrene to be distorted or to collapse.

An object of this invention is to provide novel flame-retardant synthetic resin compositions.

Another object is to provide novel flame-retardant foamable synthetic resin compositions which, when foamed, have excellent mechanical properties.

A further object is to provide processes for preparing such compositions.

SUMMARY OF THE INVENTION

These and other objects are attained by incorporating into a normally flammable synthetic resin composition a flame-retardant agent which is an ar-halo aromatic compound containing at least two ar-alkenyloxy groups ortho or para to an ar-halo substituent.

DESCRIPTION OF THE PREFERRED EMBODIMENTS

The following examples are given to illustrate the invention and are not intended as a limitation thereof. Unless otherwise specified, quantities mentioned are quantities by weight.

EXAMPLE I

Tumble 100 parts of foamable polystyrene beads containing 6% of a pentane blowing agent for one minute with 0.5 part of a solution of 20% of sorbitan monolaurate in methylated spirits, and then tumble them for one minute with 0.5 part of powdered 1,4-bisallyloxy-2,3,5,6-tetrabromobenzene. Prefoam the resultant coated beads by exposing them to steam for four minutes at a pressure of 9 p.s.i.g., place the prefoamed beads in a suitable mold, and inject steam through small holes in the mold walls to expand the prefoamed beads to a foamed polystyrene block having a density of one pound per cubic foot.

The block of foamed polystyrene thus formed is pure white, has excellent mechanical properties, and is free from distortion.

Test the foamed product for flame-retardant properties by British Standard 3932 (1965), using six sample strips 8 inches x 1 inch x ½ inch cut from the molded block. The flame Test Rating resulting from this test is 6 out of 6 Self-extinguishing.

Confirm the results by the more rigorous modified British Standard known as Plastics Test Method No. 117/1, using four sample strips 6 inches x 2 inches x ½ inch. The Flame Test Rating resulting from this test is 3 out of 4 Self-extinguishing and 1 out of 4 non-burning.

As demonstrated above, a foamed product having an excellent degree of flame-retardancy as well as excellent mechanical properties and freedom from distortion is obtained when the foamable polystyrene beads from which it is prepared are coated with 1,4-bisallyloxy-2,3,5,6-tetrabromobenzene. Similar results are observed when:

(1) The foamable beads are beads of polyethylene, polypropylene, polymethyl methacrylate, polyvinyl acetate, a styrene-acrylonitrile (80:20) copolymer, a styrene-alpha-methylstyreneacrylonitrile (80:5:15) terpolymer, a styrene-methyl methacrylate (90:10) copolymer, or a toughened polystyrene having a polybutadiene rubber content of 5%, or (2) the flame-retardant agent is 1,3-bisallyloxy-2,4,6-tribromobenzene, 1,2 - bisallyloxy - 3,4,5,6-tetrabromobenzene, 1,4 - bisalllyloxy - 2 - methyl-3,5,6-tribromobenzene, 1,4,5,8 - tetraallyloxy - 2,3,6,7 - tetrabromonaphthalene, 1,4 - bisallyloxy - 2,3 - dichloro-5,6-dibromobenzene, 1,4-bisallyloxy-2,3,5,6 - tetrachlorobenzene, or 1,4,6,9 - tetraallyloxy-2,3,5,7,8,10 - hexabromophenanthrene.

EXAMPLE II

Charge 259 parts of water, 0.94 part of polyvinylpyrrolidone having a molecular weight of about 300,000, 0.25 part of sodium pyrophosphate, 0.02 part of sodium bicarbonate, 100 parts of styrene, 0.2 part of 1,4-bisallyloxy-2,3,5,6-tetrabromobenzene, 0.7 part of benzoyl peroxide, and 6.35 parts of petroleum ether having a boiling range of 45–50° C. to an autoclave provided with a stirrer. Pressurize with nitrogen to a pressure slightly above atmospheric pressure, close the autoclave, and heat to 80° C. for 10 hours while stirring. At this stage about 50% of the styrene has polymerized. Now add 1.41 parts of the petroleum ether under pressure over a period of 3 hours, and continue the polymerization with stirring at 82° C. for a further 21 hours. Then allow the autoclave to cool, vent it to atmospheric pressure, open the autoclave, and recover the resultant polymer beads.

Prefoam the beads in a steam atmosphere for four minutes to form spherical foamed beads which are free from surface deformities and have a bulk density of 11 ounces per cubic foot. Allow the prefoamed beads to dry on an open tray for one day, and then mold them into a one foot cube block.

The block has good physical properties, the beads being well bonded together.

Test the foamed product for flame-retardant properties as in Example I. The Flame Test Rating resulting from British Standard 3932 is 6 out of 6 Self-extinguishing; the Rating resulting from Test 117/1 is 3 out of 4 Self-extinguishing and 1 out of 4 non-burning.

EXAMPLE III

Spray both major surfaces of a foamed polystyrene sheet having a thickness of ½ inch and a density of about one pound per cubic foot with a 10% aqueous dispersion of 1,4-bisallyloxy-2,3,5,6-tetrabromobenzene, and dry the coated sheet. The coated sheet has good self-extinguishing properties as measured by the standard tests.

EXAMPLE IV

Coat polystyrene pellets with 0.5% of finely-divided silica and 0.5% of 1,4-bisallyloxy-2,3,5,6-tetrabromobenzene, and charge the coated pellets to an extruder having a barrel diameter of 1½ inch, an adjustable pressure-reducing valve behind a slit die which is 0.035 inch wide, and means for injecting isobutene into the barrel. Extrude the coated pellets under a barrel pressure of about 2000 p.s.i. through the die at a die temperature of 125° C. while injecting isobutene so as to produce a composition containing 13% of isobutene. The product is a foamed polystyrene sheet having a thickness of about ½ inch and a density of two pounds per cubic foot.

Test the foamed product for flame-retardant properties by British Standard 3932 as in Example I. The resulting Flame Test Rating is 6 out of 6 Self-extinguishing.

EXAMPLE V

Extrude foamable polystyrene pellets containing 1% of finely-divided silica, 1% of zinc stearate, 10% of butane, and 0.5% of 1,4-bisallyloxy-2,3,5,6-tetrabromobenzene at a pressure of 500 p.s.i. and a temperature of 140° C. through an annular ring die having an overall diameter of ½ inch and an annulus width of 0.04 inch at a flow rate of 10 pounds per hour, while maintaining a slight excess air pressure inside the tube to support it. The product is a tube of foamed polystyrene having an outer diameter of about 2 inches, an inner diameter of about 1 inch, and an overall average density of 2 pounds per cubic foot.

When tested for flame-retardant properties by British Standard 3932, the product has a Flame Test Rating of 6 out of 6 Self-extinguishing.

The resins which can be rendered flame-retardant in accordance with the invention include any normally flammable synthetic resins which can advantageously be given a degree of flame-retardancy. In a preferred embodiment of the invention, the resin is a polymer of one or more ethylenically-unsaturated monomers, e.g., a hydrocarbon monomer such as ethylene, propylene, butylene, styrene, alpha-methylstyrene, o-, m-, or p-methylstyrene, other ar-alkylstyrenes, etc., or other suitable monomers such as methyl acrylate, ethyl acrylate, propyl acrylate, butyl acrylate, the corresponding alkyl methacrylates, vinyl acetate and other vinyl esters, etc. Such polymers include interpolymers of one or more of the above monomers with minor amounts, e.g., up to about 20% by weight, of other monomers such as acrylonitrile, butadiene, isoprene, etc., as well as mixtures of two or more of such polymers. The invention is particularly applicable to polystyrene resins, such as polystyrene itself or a toughened polystyrene, i.e., a polystyrene having physically or chemically combined therewith a minor proportion, e.g., 1–15% by weight, of a natural or synthetic rubber, e.g., substantially linear or branched polymers of conjugated dienes, such as butadiene, isoprene, etc., including copolymers thereof with lesser amounts of comonomers such as styrene, acrylonitrile, methyl methacrylate, etc.

As indicated above, the invention is of particular value in providing foamable synthetic resins which can be expanded by conventional techniques to form foamed resins having an excellent degree of flame-retardancy as well as good mechanical properties. As is well known, a foamable resin material contains a minor proportion of a blowing agent, which in general is a substance which volatilizes on heating, such as a low boiling liquid, or a chemical blowing agent. In some instances a volatile agent is one that is in the form of a vapor at atmospheric pressure and ordinary temperatures, such as 20° C., but it is preferably a volatile liquid, normally one that swells but does not dissolve the polymer. Exemplary of volatile substances that can be used are lower aliphatic hydrocarbons containing up to six carbon atoms, e.g., a butane, a pentane, a hexane, cyclopentane, cyclohexane, etc.; lower alkyl halides such as methyl chloride, trichloromethane, 1,2-dichlorotetrafluoroethane; and mixtures of these substances. The lower aliphatic hydrocarbons, especially the pentanes, are preferred, and in practice a petroleum fraction consisting predominantly of pentanes can be usefully employed. The blowing agent can also be a chemical blowing agent, e.g., a bicarbonate such as sodium bicarbonate or ammonium bicarbonate or an organic compound which yields nitrogen on heating such as dinitrosopentamethylene diamine or barium azodicarboxylate. The blowing agent is usually employed in a proportion of about 2–15%, especially 3–10%, based on the weight of the foamable material; for example, the use of about 6% by weight of a pentane fraction in conjunction with polystyrene gives excellent results. The foamable materials frequently contain additives such as nucleating agents, e.g., finely-divided silica, which regulate the cell size.

The flame-retardant agents of the invention are ar-halo aromatic compounds containing at least two ar-alkenyloxy groups ortho or para to an ar-halo substituent. Preferably these compounds contain two or more halo substituents, which can be identical or different, and more preferably there are two or more halo substituents on the same aromatic ring as the alkenyloxy groups. It is also preferred that each of the alkenyloxy groups be ortho or para, preferably ortho, to more than one halo substituent. The halo substituent is generally chloro or bromo, preferably bromo because of the greater efficiency of bromo compounds as flame-retardant agents. The alkenyloxy groups are preferably two in number and can be the same or different. They preferably contain not more than 5, usually 3 or 4, carbon atoms, and the double bond is preferably in a 2,3-position relative to the oxygen atom. Allyloxy groups are especially preferred. The compound can contain one or more aromatic rings and can have, in addition to the ar-halo and ar-alkenyloxy substituents, ar-substituents such as alkyl (e.g., methyl, ethyl, propyl, butyl, etc.) or alkoxy (e.g., methoxy, ethoxy, etc.) groups. Exemplary of suitable flame-retardant agents are 1,4-bisallyloxy-2,3,5,6-tetrabromobenzene,
1,2-bisallyloxy-3,4,5,6-tetrabromobenzene,
1,4-bisallyloxy-2-methyl-3,5,6-tribromobenzene,
1,4,5,8-tetraallyloxy-2,3,6,7-tetrabromonaphthalene,
1,4-bisallyloxy-2,3-dichloro-5,6-dibromobenzene,
1,4-bisallyloxy-2,3,5,6-tetrachlorobenzene,
1,2-bisallyloxy-3,4,5,6-tetrachlorobenzene,
1,3-bisallyloxy-2,4,6-tribromobenzene,
1,3-bisallyloxy-2,4,5,6-tetrabromobenzene,
1,4,6,9-tetraallyloxy-2,3,5,7,8,10-hexabromophenanthrene, etc. Such compounds can be prepared by reacting an alkenyl halide with an appropriate hydroxyaromatic compound having at least one ar-halo and at least two ar-hydroxy substituents, each hydroxy group being ortho or para to an ar-halo substituent, or with a salt of the hydroxyaromatic compound, at a temperature of 0–150° C., preferably 55–105° C. In the reaction, an alkali metal iodide can be advantageously employed in admixture with the alkenyl halide, and it is usually preferred to conduct the reaction in an organic solvent such as methanol, ethanol, isopropanol, acetone, methyl ethyl ketone, or the like.

The quantity of the flame-retardant employed depends on several factors, including, e.g., the identity of the halo substituents, the degree of flame-retardancy desired, and the particular method by which it is mixed with or incorporated in the resin. Generally it is preferable for the synthetic resin to contain 0.1–7%, especially 0.2–5%, e.g., 0.3–3%, by weight of the flame-retardant agent. A quantity of the flame-retardant agent in the lower part of the above range is usually sufficient when it is incorporated with the resin during the polymerization of a monomer. In these circumstances 0.1–1.5%, especially 0.25–1%, e.g., about 0.5%, of flame-retardant agent, based on the weight of the resin, can give excellent flame-retardant properties.

The flame-retardant agent is preferably physically mixed with the synthetic resin. This can be done in any convenient way, e.g., by mixing in a mill or an extruder or by applying the flame-retardant agent to the surface of a shaped resin article, but a method that often presents practical advantages is to coat particles of the resin, especially foamable particles, with a thin surface layer comprising the flame-retardant agent. This can be accomplished by employing the flame-retardant agent in powder form or in conjunction with a solvent or liquid dispersion medium. In many instances an adhesive is preferably used, e.g., an oil such as a suitable mineral oil; a wax; or an ester, particularly a solid ester, such as a glyceride, for instance a mono- or di-acetate, or an ester of a long chain fatty acid, particularly a mono-ester. Thus there can be employed, e.g., an ester of lauric, stearic, palmitic, or oleic acid. Particularly good results are obtained using a mono-ester of sorbitan, especially the mono-laurate, mono-palmitate, or mono-stearate, or sorbitan trioleate. When the flame-retardant agent is used as a liquid composition such as a solution or dispersion (which may or may not contain an adhesive), the composition can be aqueous or non-aqueous and can be applied, e.g., by spraying, rolling, or brushing. Moreover, if an adhesive is used, the adhesive can be applied first, for instance as a fairly mobile solution (e.g., a solution having a viscosity of less than 500 centipoises at 25° C.) in a solvent, and then the finely-divided flame-retardant agent can be dusted on by any suitable technique, e.g., tumbling the components together in a drum. Suitable solvents include alcohols such as methanol, ethanol, isopropanol, etc., and, when the resin particles are to be foamable, volatile liquids such as those mentioned above as being suitable blowing agents, e.g., a pentane or hexane. After the treatment, any residual solvent can be allowed to evaporate, if desired in a current of air.

The flame-retardant agents are also particularly useful in foamed resin materials produced by extrusion of a foamable resin composition comprising a blowing agent. In a preferred extrusion process, a volatile blowing agent such as a butane or a pentane is injected into the barrel of the extruder so that it is mixed with the resin to produce the formable composition. The flame-retardant agent can be supplied in admixture with or incorporated in particles of resin fed to the extruder, or it can be dissolved in the blowing agent which is to be injected into the polymer in the barrel of the extruder. Alternatively, a premixed composition comprising the resin, the blowing agent, and the flame-retardant agent can be fed to the extruder. It is often convenient to use a particulate polymer, the particles of which have been coated with the flame-retardant agent.

As an alternative to physical mixing, the flame-retardant agent can be incorporated in the resin during its production by the polymerization of an ethylenically-unsaturated monomer. When this method of incorporation is employed, the polymerization conditions are those conventionally used for the polymerization of the monomer. Thus, the polymerization can be conducted by a mass, solution, emulsion, or suspension technique (preferably by a suspension polymerization technique), thermally or in the presence of a catalyst such as an azo compound, e.g., azobisisobutyronitrile, or a peroxy compound, e.g., cumene hydroperoxide, benzoyl peroxide, acetyl benzoyl peroxide, di-t-butyl peroxide, etc., alone or in conjunction with a reducing agent providing a redox system. Conventional reaction temperatures, e.g., 50–200° C., and pressures, e.g., 1–10 atm., can be used, and additives such as blowing agents, etc. can be present. When a suspension polymerization techniques is employed, the aqueous system is agitated sufficiently to maintain suspension, and conventional suspending agents, e.g., water-insoluble inorganic oxides, hydroxides, and salts, and organic water-soluble polymers such as polyvinyl alcohols, methyl cellulose, gelatine, polyvinylpyrrolidone, carboxymethylcellulose and its water-soluble salts, and polyacrylic acids and their water-soluble salts, can be employed. After the suspension polymerization, the polymer beads can be recovered by the usual techniques of allowing the reaction mixture to cool to ambient temperature, adjusting the pressure to atmospheric pressure, filtering off the beads, washing the beads if necessary, and drying them.

Foaming and molding operations performed on the flame-retardant foamable synthetic resin compositions of the invention can follow ordinary practice. Thus, for example, the foamable particles can be heated by steam, hot water, or air, or under the influence of an infra-red heater, to produce prefoamed beads, which are preferably conditioned by exposing them to the atmosphere for a day or two before they are used in the molding operation. A suitable mold can then be partially or fully filled with the prefoamed beads and closed, and steam is injected through inlets in the mold walls. When foaming is complete, the steam supply is shut off, and the resulting flame-retardant product is allowed to cool before the mold is opened. Other methods of molding can also be employed.

It is obvious that many variations can be made in the products and processes set forth above without departing from the spirit and scope of this invention.

What is claimed is:

1. A flame-retardant composition comprising a normally flammable polymer of at least one ethylenically-unsaturated monomer and an ar-halo aromatic compound containing at least two ar-alkenyloxy groups ortho or para to an ar-halo substituent, said ar-halo aromatic compound containing a single benzene, naphthalene or phenanthrene nucleus.

2. A foamable flame-retardant composition comprising a normally flammable polymer of an ethylenically-unsaturated monomer, a blowing agent, and an ar-halo aromatic compound containing at least two ar-alkenyloxy groups ortho or para to an ar-halo substituent, said ar-halo aromatic compound containing a single benzene, naphthalene or phenanthrene nucleus.

3. The composition of claim 2 wherein the polymer is a styrene polymer.

4. The composition of claim 3 wherein the styrene polymer is polystyrene.

5. The composition of claim 2 wherein the ar-halo aromatic compound contains at least two ar-halo substituents on the same aromatic ring as the ar-alkenyloxy groups, each of which is ortho to more than one ar-halo substituent.

6. The composition of claim 5 wherein the ar-halo substituents are ar-bromo substituents.

7. The composition of claim 5 wherein the double bond of the ar-alkenyloxy groups is in a 2,3-position relative to the oxygen atom.

8. The composition of claim 7 wherein the ar-alkenyloxy groups are ar-allyloxy groups.

9. The composition of claim 2 wherein the ar-halo aromatic compound is 1,4-bisallyloxy-2,3,5,6-tetrabromobenzene, 1,3-bisallyloxy-2,4,6-tribromobenzene, or 1,2-bisallyloxy-3,4,5,6-tetrabromobenzene.

10. The composition of claim 2 wherein the polymer is polystyrene and the ar-halo aromatic compound is 1,4-bisallyloxy-2,3,5,6-tetrabromobenzene.

11. A process which comprises coating particles of a normally flammable synthetic resin with a thin layer comprising an ar-halo aromatic compound containing at least two ar-alkenyloxy groups ortho or para to an ar-halo substituent, said ar-halo aromatic compound containing a single benzene, naphthalene or phenanthrene nucleus.

12. In a process for extruding a normally flammable foamable synthetic resin composition containing a volatile blowing agent, the improvement which comprises incorporating into the foamable composition an ar-halo aromatic compound containing at least two ar-alkenyloxy groups ortho or para to an ar-halo substituent, said ar-halo aromatic compound containing a single benzene, naphthalene or phenanthrene nucleus.

13. In a process for polymerizing an ethylenically-unsaturated monomer in aqueous suspension, the improvement which comprises conducting the polymerization in the presence of an ar-halo aromatic compound containing at least two ar-alkenyloxy groups ortho or para to an ar-halo substituent, said ar-halo aromatic compound containing a single benzene, naphthalene or phenanthrene nucleus.

References Cited
UNITED STATES PATENTS

| | | | |
|---|---|---|---|
| 3,269,962 | 8/1966 | Eichhorn | 260—2.5FP |
| 3,271,333 | 9/1966 | Eichhorn | 260—2.5FP |

MURRAY TILLMAN, Primary Examiner

M. FOELAK, Assistant Examiner

U.S. Cl. X.R.

260—45.7, 649